United States Patent
Degioanni et al.

(10) Patent No.: US 12,339,988 B2
(45) Date of Patent: Jun. 24, 2025

(54) ARTIFICIAL INTELLIGENCE (AI) MODEL TRAINED USING CLUSTERING AND REINFORCEMENT LEARNING FOR DATA DE-IDENTIFICATION ENGINE

(71) Applicant: Accenture Global Solutions Limited, Dublin (IE)

(72) Inventors: Laura Wendy Hèléne Sylvie Angéle Degioanni, Cagnes-sur-mer (FR); Richard Vidal, Antibes (FR); Laetitia Kameni, Antibes (FR); Nantomiaro Ramanjakanoro Ralibera, Lyons (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 232 days.

(21) Appl. No.: 18/335,470

(22) Filed: Jun. 15, 2023

(65) Prior Publication Data

US 2024/0303360 A1 Sep. 12, 2024

(30) Foreign Application Priority Data

Mar. 6, 2023 (EP) .................................... 23305293

(51) Int. Cl.
 *G06F 21/62* (2013.01)
(52) U.S. Cl.
 CPC ................................ *G06F 21/6218* (2013.01)
(58) Field of Classification Search
 None
 See application file for complete search history.

(56) References Cited

U.S. PATENT DOCUMENTS

| | | | |
|---|---|---|---|
| 2018/0004978 A1* | 1/2018 | Hebert | G06F 16/2457 |
| 2020/0242138 A1* | 7/2020 | Russ | G06F 16/2455 |
| 2023/0418977 A1* | 12/2023 | Bennati | H04W 4/021 |

OTHER PUBLICATIONS

Jordon et al., "PATE-GAN : Generating Synthetic Data With Differential Privacy Guarantees", published Dec. 20, 2018; ICLR 2019 Conference Blind Submission.
(Continued)

*Primary Examiner* — Brian F Shaw
(74) *Attorney, Agent, or Firm* — Mannava & Kang, P.C.

(57) ABSTRACT

The disclosed system and method provide an artificial intelligence (AI) model trained using clustering and reinforcement learning. Data in a dataset can be loaded for de-identification, along with data scope answers. The data can be audited, and once audited, the audited data and the data scope answers can be provided to a strategy recommendation engine including the trained AI model. The engine can determine a cluster corresponding to the dataset and assesses strategies for data de-identification based on the determined cluster. The strategies can be ranked and provided as output, providing the ability to better de-identify the dataset by indicating which techniques will be the most effective. Additionally, the system and method can automatically implement a top-ranked strategy satisfying certain criteria as a determined optimal approach for data de-identification. Clustering and reinforcement learning may efficiently and automatically glean information from unlabeled data. Feedback-based retraining may improve performance further.

20 Claims, 13 Drawing Sheets

(56) References Cited

OTHER PUBLICATIONS

Nissim et al., "Differential Privacy: A Primer for a Non-Technical Audience", published Feb. 14, 2018; Privacy Tools for Sharing Research Data project, Harvard University.
Sweeney, "k-Anonymity: A model for protecting privacy", International Journal on Uncertainty, Fuzziness and Knowledge-based Systems, 10(5), 2002; 557-570.
Machanavajjhala et al., "L-diversity: privacy beyond k-anonymity", 22nd International Conference on Data Engineering (ICDE'06), Atlanta, GA, USA; Apr. 3-7, 2006.
Park et al., "Data Synthesis based on Generative Adversarial Networks", Proceedings of the VLDB Endowment, vol. 11, No. 10, published Aug. 2018; Rio de Janeiro, Brazil; https://doi.org/10/14778/3231751.3231757.
Li et al., "t-Closeness: Privacy beyond k-Anonymity and l-Diversity", 2007 IEEE 23rd International Conference on Data Engineering, Istanbul, Turkey, Apr. 15-20, 2007; chrome-extension://efaidnbmnnnibpcajpcglclefindmkaj/https://www.cs.purdue.edu/homes/ninghui/papers/t_closeness_icde07.pdf.

* cited by examiner

ARTIFICIAL INTELLIGENCE (AI) MODEL TRAINED USING CLUSTERING AND REINFORCEMENT LEARNING FOR DATA DE-IDENTIFICATION ENGINE

PRIORITY CLAIM

This application claims the benefit of priority under 35 U.S.C. § 119 to European patent application number 23305293.5, filed on Mar. 6, 2023.

TECHNICAL FIELD

The present disclosure generally relates to an artificial intelligence (AI) model trained using clustering and reinforcement learning. More specifically, the present disclosure generally relates to building a de-identification strategy recommendation engine powered by AI that can recommend and/or implement a most suitable de-identification strategy that could involve one or several techniques based on auditing the data to de-identify and its future usage.

BACKGROUND

Many business projects rely on individual sensitive, identifying data (e.g., individual's name, address, birthdate, social security number, health history, transaction history, bank balance, etc.), especially in financial, insurance or medical domains. With the growth of legislation and regulations around data privacy, businesses must ensure that they are properly handling sensitive data and that there are not putting at risk their customer privacy. Thus, obtaining and processing raw data to start to build and train solutions may cause many difficulties, long delays, and may even be a blocking point of a project.

To overcome these challenges, data de-identification sets itself apart as a solution for businesses. By preventing re-identification by modifying or transforming a dataset through an algorithm, data de-identification unlocks data values while respecting the data privacy requirements and may reduce drastically the time it takes to provision safe data to work on.

However, the main challenge of a de-identification process is to find the strategy that can best fit the data to be de-identified and the future usages of the data. Many de-identification techniques exist, and no single technique fits all data. A de-identification process is to be wisely chosen depending on the needs, the context in which anonymization or pseudonymization needs to take place, the usage of the dataset in the future, and the data itself. A poorly chosen de-identification strategy may put the data at risk.

Choosing the right strategy is a time-consuming process which requires a specific knowledge about the particularities of each technique. Third party subject matter experts are often needed to help with de-identification issues, often involving giving access to the data leading to vulnerabilities, delays to get the authorizations, and additional monetary costs. These drawbacks may outweigh all of the benefits of using a de-identification process.

There is a need in the art for a system and method that addresses the shortcomings discussed above.

SUMMARY

The present disclosure describes a system and method for building and applying a de-identification strategy recommendation engine powered by AI that can recommend and/or implement a most suitable de-identification strategy based on auditing the data to de-identify and its future usage.

At present, it may be difficult to determine the best way to perform data de-identification tasks. Such a determination may be difficult for several reasons. For example, there may be limited available training data, each dataset may have its own distinctive attributes, and it may be difficult to decide when a technique is successful. The disclosed systems and methods may provide ways to effectively decide how to perform data de-identification. These approaches may be particularly valuable because the analysis used to make the recommendation may occur automatically. For example, it may be possible to make data de-identification recommendations by training a strategy recommendation engine trained using clustering and reinforcement learning, without the need for labeled data. After a risk assessment, a dataset can be loaded and audited, such that the audited dataset, along with data scope information, may be provided to the engine. The engine then automatically provides recommendations.

In one aspect, the disclosure provides an artificial intelligence (AI)-based computer implemented method of data de-identification. The method may include loading data in a dataset for de-identification. The method may further include loading data scope answers corresponding to the dataset. The method may further include performing a data audit on the data in the dataset. The method may further include providing the audited data and the data scope answers to a strategy recommendation engine trained to assess data de-identification strategies. The strategy recommendation engine may be trained by clustering datasets in a datalake and performing reinforcement learning using the clustered datasets. The method may further include determining a cluster corresponding to the dataset for de-identification. The method may further include ranking strategies for data de-identification based on the determined cluster using the strategy recommendation engine. The method may further include presenting to a user, via a display of a user interface, the ranked strategies.

In yet another aspect, the disclosure provides a non-transitory computer readable medium storing software that may comprise instructions executable by one or more computers which, upon execution, cause the one or more computers to load data in a dataset for de-identification. The instructions may further cause the one or more computers to load data scope answers corresponding to the dataset. The instructions may further cause the one or more computers to perform a data audit on the data in the dataset. The instructions may further cause the one or more computers to provide the audited data and the data scope answers to a strategy recommendation engine trained to assess data de-identification strategies. The strategy recommendation engine may be trained by clustering datasets in a datalake and performing reinforcement learning using the clustered datasets. The instructions may further cause the one or more computers to determine a cluster corresponding to the dataset for de-identification. The instructions may further cause the one or more computers to rank strategies for data de-identification based on the determined cluster using the strategy recommendation engine. The instructions may further cause the one or more computers to present to a user, via a display of a user interface, the ranked strategies.

In yet another aspect, the disclosure provides an artificial intelligence (AI)-based system for data de-identification, which comprises one or more computers and one or more storage devices storing instructions that may be operable, when executed by the one or more computers, to cause the one or more computers to load data in a dataset for de-identification. The instructions may further cause the one or more computers to load data scope answers corresponding to the dataset. The instructions may further cause the one or more computers to perform a data audit on the data in the dataset. The instructions may further cause the one or more computers to provide the audited data and the data scope answers to a strategy recommendation engine trained to assess data de-identification strategies. The strategy recommendation engine may be trained by clustering datasets in a datalake and performing reinforcement learning using the clustered datasets. The instructions may further cause the one or more computers to determine a cluster corresponding to the dataset for de-identification. The instructions may further cause the one or more computers to rank strategies for data de-identification based on the determined cluster using the strategy recommendation engine. The instructions may further cause the one or more computers to present to a user, via a display of a user interface, the ranked strategies.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
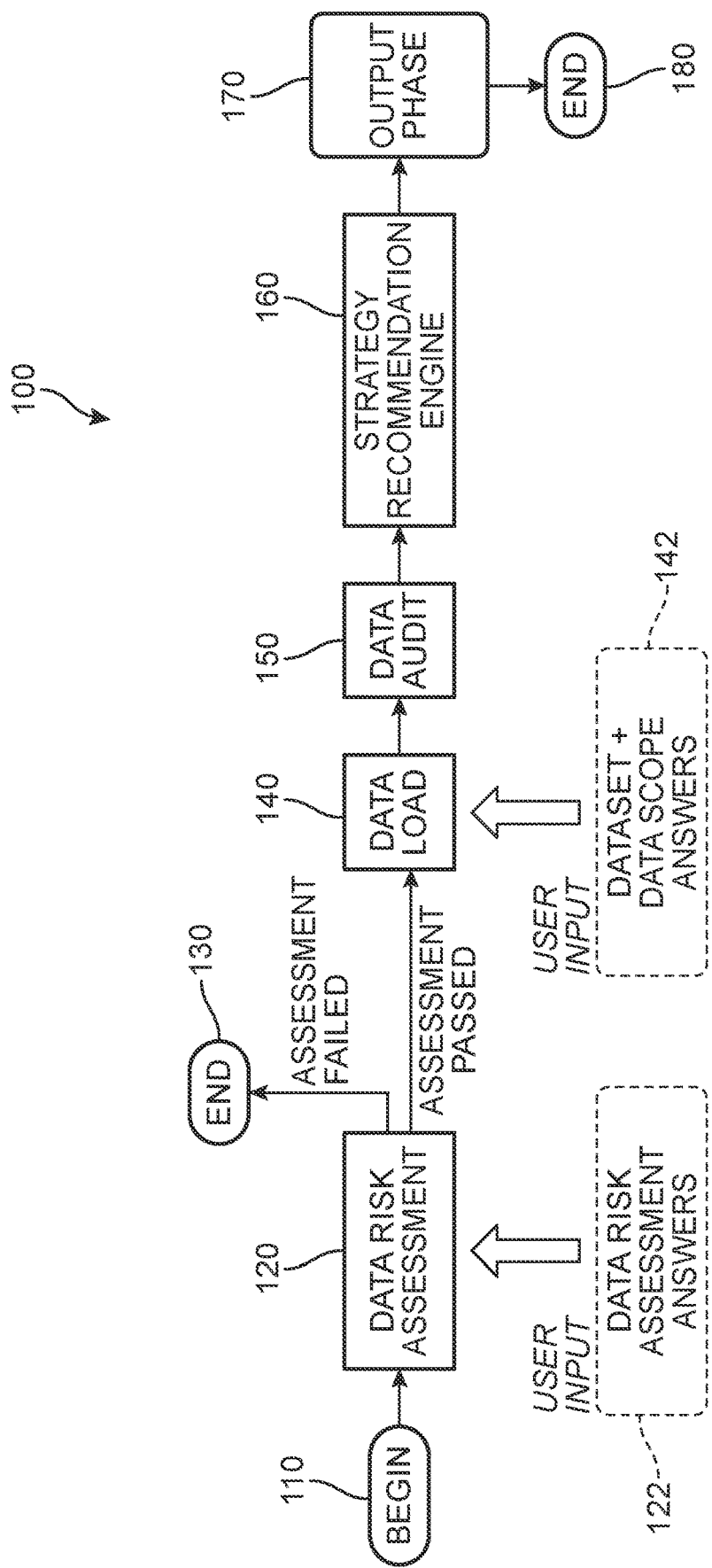
FIG. 1 is a diagram of an overview of a method performed by a data de-identification advisor according to an embodiment.

While tools exist to help businesses by guiding them in their data de-identification tasks, most of these tools rely on manual settings and do not recommend a strategy. These tools assume that the client already knows which technique fits better on their datasets. At present, there is no artificial intelligence (AI)-powered solution to the problem of selecting a tool for at least the following reasons.

First, there is no real available data de-identification history. Even though data anonymization and pseudonymization techniques have existed for a while, their applications for businesses are quite new and result from the latest regulations (e.g., General Data Protection Regulation). These techniques are used individually by each business and the results are not shared. In other words, existing systems do not presently have access to historical data that describes the data characteristics, the data usage, the data de-identification performed, and the results of the data de-identification.

Second, each sensitive dataset has its own singularities and unique aspects due to its specific features, its usage, and its processing environment. These unique aspects make generalization difficult. Third, there are no legal or other guidelines that define when a data de-identification process is considered as successful and no evaluation framework exists. Even if a recommendation is made there is no concrete way to certify the success or the failure of the strategy.

Thus, no other existing approach proposes an end-to-end automatic recommendation tool. However, the disclosed systems and methods include embodiments with an end-to-end anonymization and pseudonymization framework. The disclosed systems and methods allow decision makers to map out and execute their data privacy strategy through a comprehensive workflow. The disclosed systems and methods offer an intuitive risk-utility exploration framework for end users to navigate through an overwhelming number of possible combinations of anonymization and pseudonymization settings and provide meaningful reports.

The present embodiments are designed to build a de-identification strategy recommendation engine powered by artificial intelligence (AI). The engine can recommend the most suitable de-identification strategy that could involve one or several techniques based on the data to de-identify and its future usage. This de-identification strategy recommendation engine can deliver a recommendation provided in a short amount of time. The tool can also provide all the necessary background knowledge about the particularities of each strategy. Thus, the tool may help overcome the difficulties referred to above. No exchange of data is needed, and no additional costs are necessary during the process. All the mindsets of de-identification experts are summarized in the proposed tool. This facilitates the data de-identification and makes it more efficient. This proposed tool does not require specific technical skills by its users. The tool can be easy to deploy in various environments and can make it easier to manage external sensitive data transfer.

The disclosed system and method can improve a selection process by performing a series of machine-implemented analytical steps. These steps can yield a de-identification recommendation. The system can also implement the recommendation, providing a complete solution to the problem. For example, the system and method can assess data risk, load data, audit data, determine a strategy, and output and/or automatically implement the strategy in response to determining the strategy. By using machine learning during the training and analysis processes, several operational advantages may be achieved. Human biases may be avoided, processing speed is significantly increased, accuracy of clustering and assessment is improved, and auditability of results is possible. For example, the disclosed system and method can improve the process of selecting one or more submissions by drawing conclusions that were not previously possible. Additionally, the reliability, feasibility, efficiency, and resource utilization can improve. Additional advantages of the present systems and methods are presented, below.

FIG. 1 is a diagram of an overview of a method 100 performed by a data de-identification advisor according to an embodiment. The method 100 begins a process of identifying optimal techniques for data de-identification (operation 110). Next, the method proceeds to perform a data risk assessment 120 (or operation 120). To carry out the data risk assessment, the method receives data risk assessment answers 122 as user input. The data risk assessment is discussed in greater detail in FIG. 2. If the assessment fails, the method ends (operation 130). If the assessment passes, the method continues by loading data (operation 140). Performing such a legal assessment before loading the data can help prevent undesired uploading of data that may go against a legal requirement. It is to be noted that the assessment may be optional in some embodiments, which may assume that the data risk is acceptable and begin with loading data (operation 140). Thus, the system can be functional without the legal assessment, but the legal assessment can serve as a useful gatekeeper that can help minimize risk in those embodiments in which the legal assessment takes place.

The data loaded includes a dataset and a set of data scope answers 142. Once the data is loaded, the method continues by performing a data audit 150 (or operation 150). The data audit is discussed in greater detail in FIG. 3. After the data audit, the method continues by processing the audited data using a strategy recommendation engine 160 (or operation 160). The method presents the results of the strategy recommendation engine in an output phase (operation 170). The output phase (operation 170) can also include actually implementing the results of the strategy recommendation engine. Once the results are presented, the method ends (operation 180).

Figure 2:
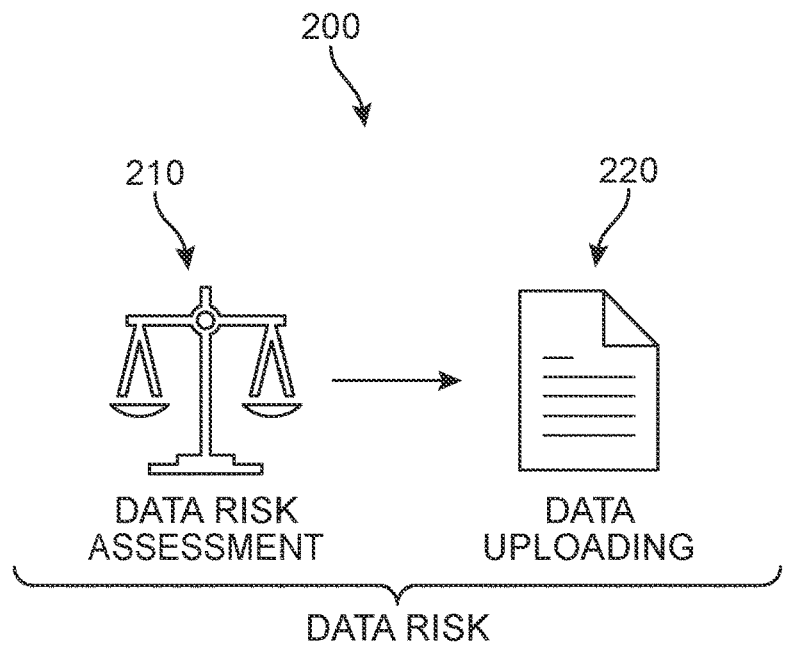
FIG. 2 is a diagram of details of data risk assessment according to an embodiment.

FIG. 2 is a diagram of details of data risk assessment 200 according to an embodiment. For example, the data risk assessment may include data risk assessment 210 and data uploading 220. While FIG. 2 shows the data risk assessment 210 as preceding the data uploading 220, the data risk assessment 210 may be omitted, though this risks potential legal problems. Also, in some embodiments, data uploading 220 may only occur if the data risk assessment 210 is successful. To begin the process, the user can provide answers to a data risk assessment form. An example of such a data risk assessment form is provided as FIG. 11. The objective of this first step is to establish if the recommendation can be performed or if prior legal approval is necessary before proceeding.

Based on the answers given to data risk assessment-oriented questions, some risk-related red flags may be raised. These issues can allow to categorize whether no prior legal approval seems needed or if prior legal approval is needed before proceeding. Note that, in some embodiments if prior legal approval is needed, the process will be stopped. For example, the risk assessment questions may be multiple-choice questions. Certain choices may be considered red flags. Thus, if there are sufficient red flags, the process will be aborted to resolve the legal issues. Some red flags may automatically indicate that the risk is unacceptable. Other red flags only indicate an unacceptable risk if a certain combination of factors is present together.

By contrast, if the legal indicators are favorable, the process may continue to the next phase. Once the data risk assessment has passed to proceed to the next steps, the user provides as input the sensitive dataset and answers to a data scope form. The data scope form may include various questions related to how the data will be used, aspects of the data operator, and characteristics of the dataset. These questions may also be multiple-choice questions.

For example, specific questions may include which purpose the data is to be used for, whether the data owner and operator are the same entity, who is the data beneficiary, is data reversibility needed, is the data released to a specific audience, is it a flat database or a relational database, is it the full dataset or just a subset, to what level must the data value be maintained, is the dataset dynamic or static, if the dataset is dynamic what kinds of updates, if there are outliers do they need to be reproduced, and are there any linked datasets. The answers to these questions (which are only non-limiting examples) may govern which de-identification techniques to consider, and which can be excluded as being inappropriate for a given dataset.

Figure 3:
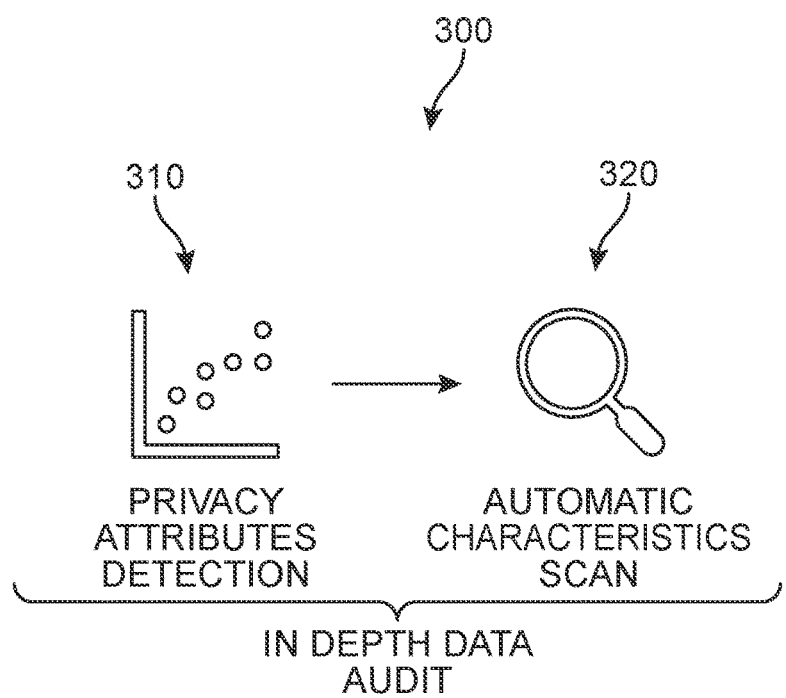
FIG. 3 is a diagram of details of an in depth data audit according to an embodiment.

FIG. 3 is a diagram of details of an in depth data audit 300 according to an embodiment. Once the dataset loads, an in-depth data audit may be performed on the candidate data to retrieve key data attributes and characteristics. The data audit aims to better understand the data structure and prepare the data for the strategy recommendation. In some embodiments, this data auditing can realize sequentially the following operations. First, importing and reading the candidate data. It is to be noted that in one embodiment, the candidate data may be under a comma-separated values (CSV) format. Other structured and unstructured formats for the candidate data may be possible as well. Second, the data auditing may extract the number of columns and the columns names. Third, the data auditing may extract the number of row and the index rows. Fourth, the data auditing may Identify the data types per columns and summarize the data types according. Fifth, the data auditing may verify out that data types are correctly encoded.

Sixth, the data auditing may check for missing variables. Seventh, the auditing may, if there are missing variables, perform data cleaning and standardization. Eighth, the data auditing may run a correlation analysis to identify if there are highly correlated features. Ninth, the data auditing may analyze features distribution, both to identify if some features are unbalanced and to spot any outliers or unique values. Tenth, the data auditing may detect if there are privacy attributes data and list the features by type. Finally, the data auditing may store the key results into a JavaScript Object Notation (JSON) file. While JSON is an example of a suitable format, other formats may be used to store the results in other embodiments. Further, it will be recognized that these are only examples of performing a data audit, and the data audit may include additional operations, fewer operations, or different operations in various embodiments.

To choose the appropriate de-identification strategy, having a full knowledge of the data and its specificities is helpful. Indeed, some de-identification techniques are only applicable to specific data types. Thus, some dataset's particular characteristics, such as outliers' presence, missing variables, unbalanced data, etc., may be considered in the strategy recommendation. For example, these aspects may help ensure that the chosen protection is strong enough. To help extract this information, as shown in FIG. 3, the data audit may include privacy attributes detection 310 and an automatic characteristics scan 320. These operations correspond to the more detailed aspects of the data audit discussed above.

Figure 4:
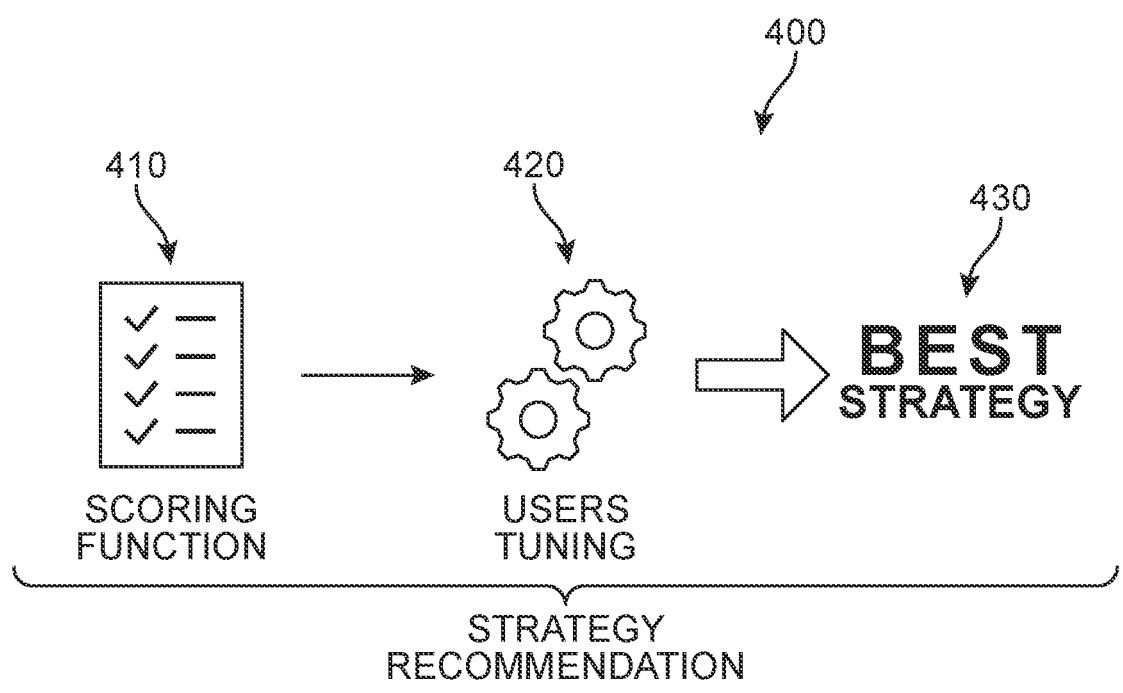
FIG. 4 is a diagram of details of a strategy recommendation according to an embodiment.

FIG. 4 is a diagram of details of a strategy recommendation 400 according to an embodiment. For example, the strategy recommendation may include a scoring function 410, followed by users tuning 420. These operations produce a best (or optimal) strategy 430. As noted below, the best strategy 430 may not only be recommended, but also automatically implemented with respect to the dataset in response to determining the best strategy. However, such a best strategy 430 may not only have the highest rank or score, but may also satisfy other criteria based on the data scope information.

These operations, in combination, provide a strategy recommendation 160. Greater details of how these techniques are provided by a strategy recommendation engine and how the strategy recommendation engine is trained is presented in FIGS. 7-8, below. The strategy recommendation engine uses as inputs the data audit outputs (as discussed in FIG. 3) and the data scope form answers. These two inputs may be combined as initial inputs for using the recommendation engine. The strategy recommendation engine is based on using a reinforcement learning algorithm coupled with a data clustering algorithm. The strategy recommendation engine is designed to have a feedback loop after the prediction. The feedback loop enables continuous learning and thus tool precision and performance improvement. The precision and performance improvement uses machine learning technology in a way that allows the strategy recommendation engine to improve its own performance.

Once the strategy recommendation engine converges to a recommendation, the system may output all or some of the following. First, the system may output a top three recommended strategies (though three is only an example, and a different number of recommended strategies may be provided). The system may also output recommendation explanations providing additional details about various techniques and/or key data characteristics to have in mind when applying the de-identification strategy. All these outputs may be communicated to the data owner and/or relevant parties (e.g., data compliance officer, data scientist, analyst, business officer or consultant) to enable them to start the de-identification process based on the recommendations. As another aspect of embodiments, it may be possible to automatically implement the top-ranked (or optimal) de-identification strategy (which may also satisfy additional criteria). By automatically implementing the top-ranked strategy, such an embodiment may automatically de-identify data in a way that has been found to be successful. Additionally, this approach will be advantageous in that the strategy recommendation engine has identified that the top-ranked strategy is the best choice from among available choices.

Figure 5:
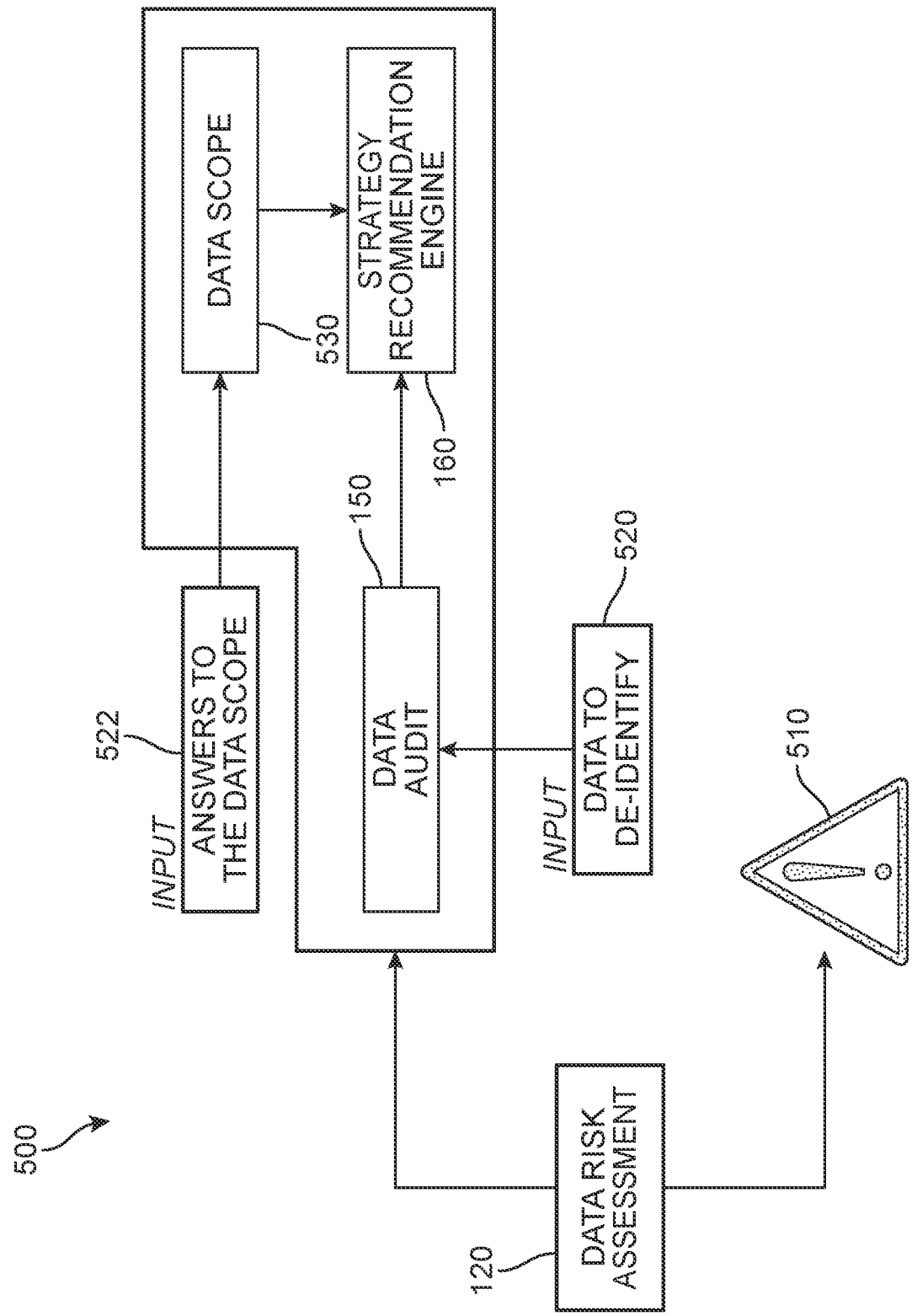
FIG. 5 is a diagram of data flow in a data de-identification advisor according to an embodiment.

FIG. 5 is a diagram of data flow in a data de-identification advisor 500 according to an embodiment. FIG. 5 summarizes some of the more detailed operations presented in FIGS. 1-4. In FIG. 5, the process begins with a data risk assessment 120. If the data risk assessment 120 fails, the process terminates with an error at 510. If the data risk assessment 120 is successful, the process continues to the main portion 540 of the process. The process involves a data audit 150 as described in detail in FIG. 3, based on inputted data to de-identify 520. The process also includes an analysis of data scope 530. The analysis of data scope is based on user answers to the data scope questions 522. The data audit 150 results and the data scope 530 results are provided to strategy recommendation engine 160.

Figure 6:
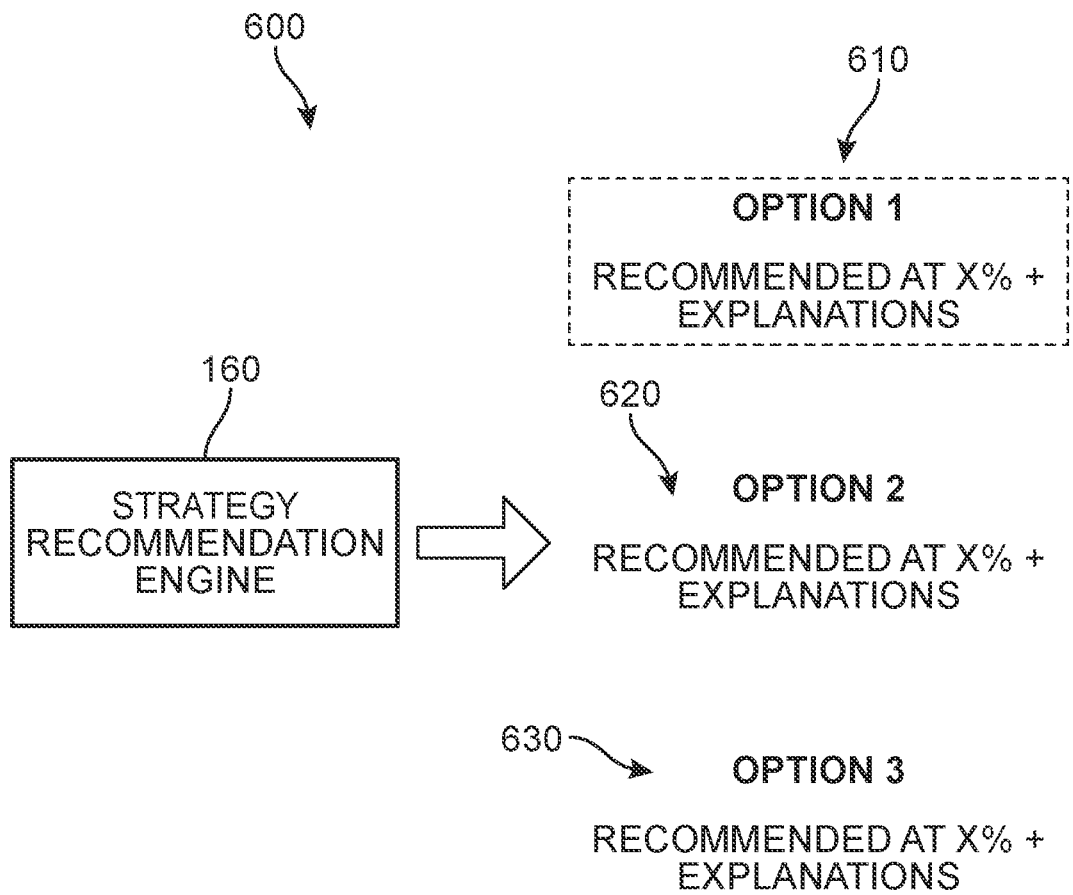
FIG. 6 is a diagram of an example of outputs of a strategy recommendation according to an embodiment.

FIG. 6 is a diagram of an example of outputs of a strategy recommendation 600 according to an embodiment. For example, FIG. 6 shows a strategy recommendation engine 160. As discussed above, the strategy recommendation engine 160 uses data audit and data scope information to determine which options are the best options and how desirable the options are. For example, the strategy recommendation engine 160 produces three options, option 1 610, option 2 620, and option 3 630. Option 1 610 is surrounded by a dashed box because it is considered to be the best (or top-ranked) recommendation. For each option of option 1 610, option 2 620, and option 3 630, the option is associated with a recommendation score (which is generally expressed as a percentage) and explanations of the option. Specific examples of such results are presented in the discussion of FIGS. 12-13, below. However, as noted, it is also possible to automatically apply top-ranked option 1 610 to minimize the need for user involvement. Such an automatic approach allows an embodiment to solve data de-identification problems using technical solutions without the need for human involvement while maintaining excellent performance and efficiency. While this approach would include implementing option 610, it would be possible to implement another option to consider factors in addition to just the ranking.

Figure 7:
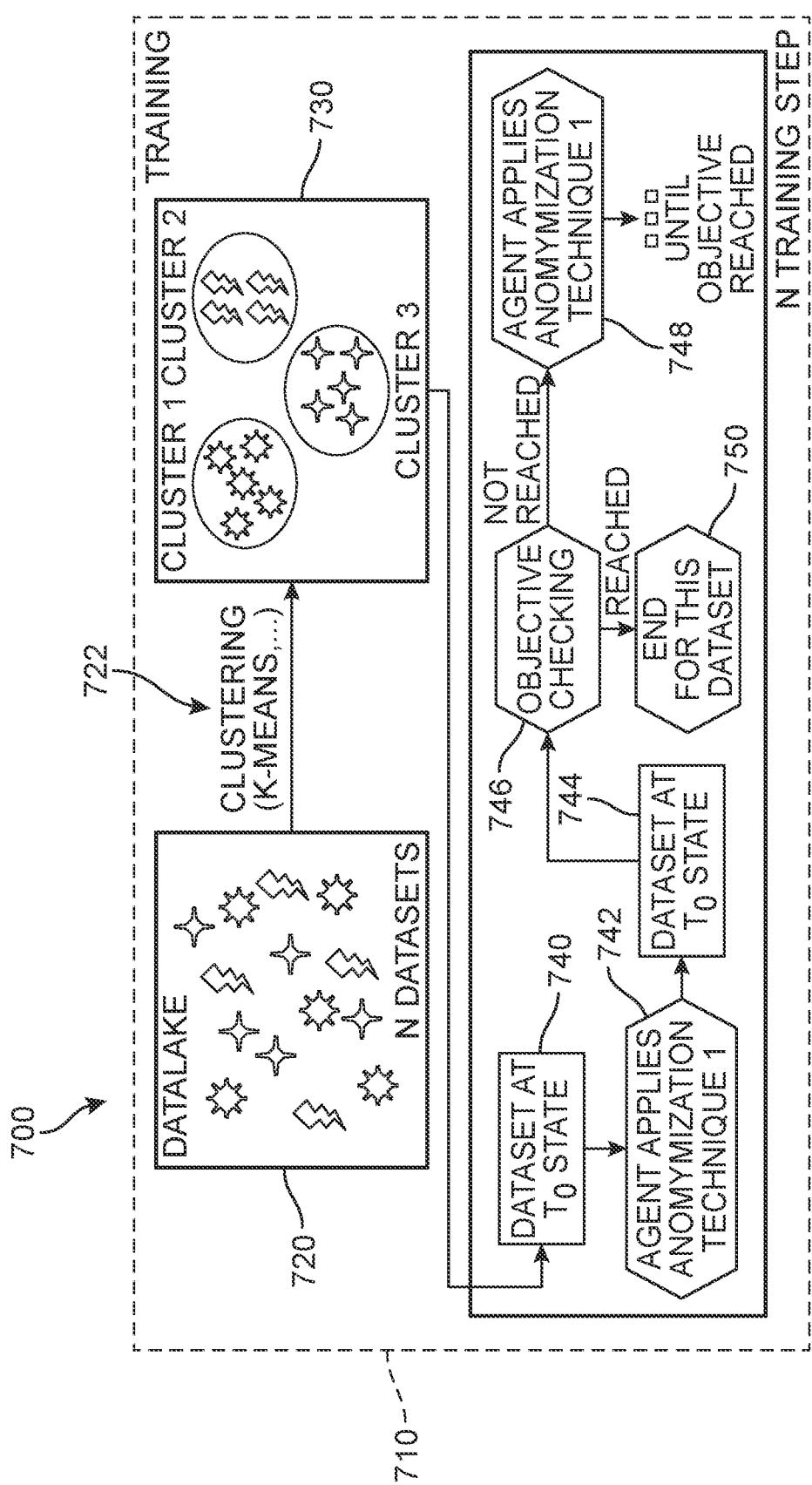
FIG. 7 is a diagram of training and using a de-identification advisor according to an embodiment.

FIG. 7 is a diagram of training and using a de-identification advisor 700 according to an embodiment. FIG. 7 shows a number of aspects involved in a training block 710 for an AI advisor according to an embodiment. The training process begins with a datalake 720, where the datalake 720 includes a plurality of datasets. For example, the datalake 720 may include n datasets in a given embodiment. It is to be noted that no labelling work is necessary. The recommendation engine includes two blocks, a training block 710, and a recommendation 860 discussed in FIG. 8.

The training block 710 includes a clustering used to gather the datasets that have similar characteristics and an agent where the goal is to train it to determine which technique is the best for the given dataset. The training of this agent is done with reinforcement learning. At the beginning of the training, the agent applies a random anonymization or pseudonymization technique to one sampled dataset in the datalake and then checks with the assessment tool (e.g., a tool that assesses privacy and utility, as discussed above) if the desired anonymity (or another data de-identification criterion) with respect to the needed data value is satisfied.

If it is the case, the agent labels this technique as the best one for this dataset and takes another dataset and continues. If not, the agent performs another action (i.e., another anonymization or pseudonymization technique or a reset). Then, the agent re-evaluates the result and redoes the same steps until the objectives are reached for each dataset in the datalake. After each objective check, the agent updates its decision table, which may be a Q-table including Q-values for states and actions, as discussed below. This updating allows for training using Q-learning.

Figure 8:
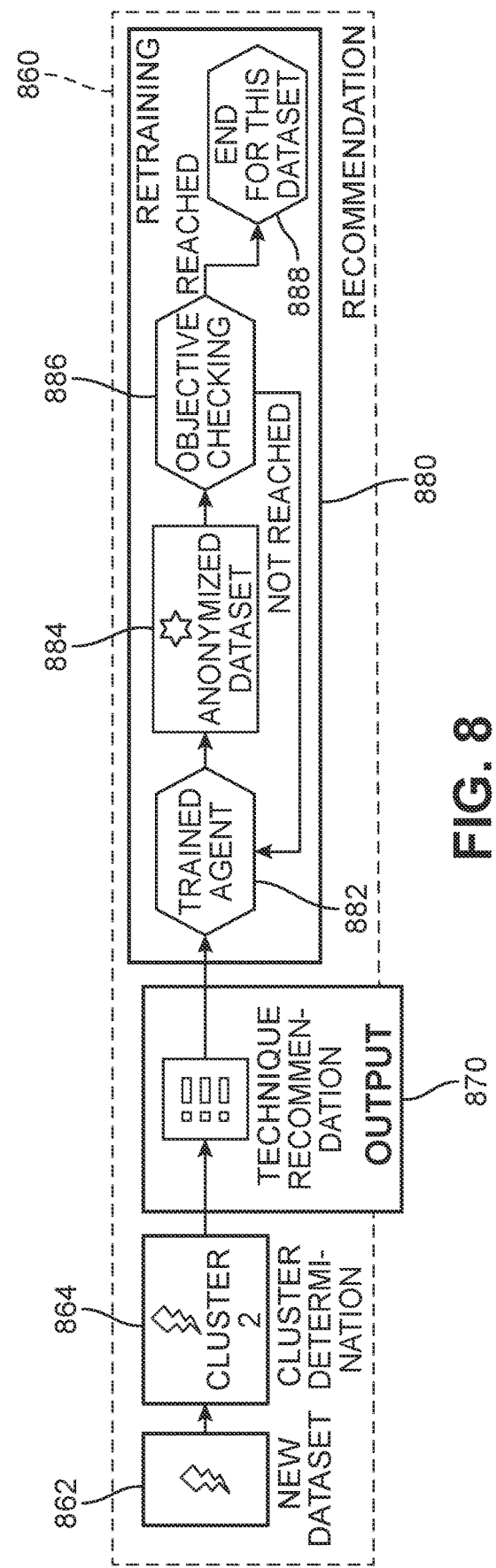
FIG. 8 is another diagram of training and using a de-identification advisor according to an embodiment.

FIG. 8 is another diagram of training and using a de-identification advisor according to an embodiment. The recommendation 860 may be a recommendation block that takes as input the new dataset and determines in which cluster the new dataset belongs. Then, the system may recommend the three (or another number) of most used techniques in the cluster with the confidence score (e.g., the percentage of times the technique was considered as being successful in the cluster). While the confidence score may be represented as a percentage, it may be noted that the confidence score may be represented in other ways, such as a probability, another quantitative metric, or a qualitative metric. More generally, this confidence score may be interpreted as the likelihood of each strategy to successfully satisfy the desired anonymity (or other data de-identification) needs, derived based on the experiments done on the cluster. If the results are not satisfactory (the confidence score is too low), a retraining of the agent in a feedback recommendation training 880 process may be possible. In the retraining, the retraining uses the first recommended technique as the initial state of the agent (instead of a random technique in the training) and then applies the same steps as in the training.

To initially train the model, the process performs a clustering step 722 on the information in the datalake 720. For example, such a clustering step 722 may use a k-means approach. However, the clustering step 722 is not limited to k-means, and may use other known clustering algorithms. For example, the clustering may use distribution models, centroid models, connectivity models, or density models. Particular types of clustering may also include affinity propagation, agglomerative hierarchical clustering, balanced iterative reducing and clustering using hierarchies (BIRCH), density-based spatial clustering of applications with noise (DBSCAN), Gaussian mixture models (GMM), k-means, mean shift clustering, mini-batch k-means, ordering points to identify the clustering structure (OPTICS), and spectral clustering. These other methods may provide more effective clustering, greater efficiency, or improved resource utilization, as well as other technical advantages.

The clustering step 722 may produce a number of clustered datasets 730. For example, the clustered datasets 730 illustrate an example, where the datasets from the datalake 720 form a cluster 1, a cluster 2, and a cluster 3. The clustering is based on identifying datasets with common characteristics and/or attributes, and does not require human intervention or labeling. The clustered datasets 730 are then fed, one by one, into an n training step. The n training step begins with the dataset at a $T_0$ state 740. The initial dataset is processed such that the training has an agent apply anonymization or pseudonymization technique 1 at 742. Such an anonymization or pseudonymization technique produces a dataset at a $T_1$ state 744.

This resulting dataset is subjected to an objective checking operation 746. The objective checking operation 746 establishes whether the objective (of successful de-identification) has been reached. If the objective has been reached, the training ends for this dataset (operation 750) and the training proceeds to the next training step. If the objection has not been reached, the training proceeds to have the agent apply an anonymization or pseudonymization technique 2 at 748. The result of such an anonymization or pseudonymization technique is another dataset at a different state, and such a result is also checked against the objective. Thus, the training includes using an agent to apply a succession of anonymization or pseudonymization techniques at each step until a given cluster is successfully anonymized or pseudonymized.

Accordingly, the training may use reinforcement learning to train the model, without the need for labeled data or human intervention. Because supervised learning would require labeled data, reinforcement learning is a form of unsupervised learning that automatically extracts intrinsic patterns in data without the need for human labeling or intervention. There are three elements of a basic reinforcement learning algorithm: the agent (which can choose to commit to actions in its current state), the environment, (which responds to the action and providers new input to the agent), and the reward (an incentive or cumulative mechanism that is returned by the environment). In some embodiments, the environment may correspond to the datalake, the reward may correspond to the data assessment, and the state may be the anonymized or pseudonymized data.

For example, an Action (A) may include all of the possible moves or operations that the agent can take to modify the environment. The State(S) is a current situation returned by the environment. The Reward (R) is an immediate return sent back form the environment to evaluate the last action. A Q-value or action-value (Q) is the expected long-term return with discount, as opposed to the short-term reward R. It takes an extra parameter, the current action a. Q(s,a) refers to the long-term return of the current state s.

The Q-table is a table that compiles all of the Q-values at each state at the time t. For example, rows of the Q-table may correspond to various possible actions, and columns may correspond to various states, or vice versa. At each iteration, this Q-table can be updated so that the agent favors some directions over others (those that maximize the predicted long-term reward). Thus, the Q-learning allows the reinforcement learning to explore the possibility space more efficiently than in a random way. By using such an approach, it becomes possible to try new configurations and then predict new class generation customized to the kind of data and its usage.

Various types of Q-learning and reinforcement learning may be used as particular techniques to improve the performance of particular embodiments. However, it may also be recognized that the training process may be adapted to use other strategies of reinforcement learning, such as policy iteration, value iteration, state-action-reward-state-action (SARSA), deep Q network (DQN), and deep deterministic policy gradient (DDPG). Some of these other strategies may offer certain advantages over typical Q-learning techniques. For example, SARSA may be an on-policy algorithm that learns a Q value based on a current policy rather than a greedy policy, DQN may leverage a neural network to estimate the Q-value function, and DDPG may use an actor-critic architecture to optimize learning results and performance.

Once the training is complete, the model may be used for outputs and recommendations 860, as shown in FIG. 8. For example, the system may receive a new dataset 862. Using the trained model, the new dataset 862 is assigned to a cluster determination 864. For example, FIG. 8 shows that new dataset 862 best conforms to cluster 2. Based on the cluster determination, the model provides an output 870, where the output 870 corresponds to a particular technique recommendation (or a ranked list of recommendations). Examples of a such a technique recommendation are presented in FIGS. 12-13. The system may also implement the recommended technique.

However, not only does the recommendation 860 shown in FIG. 8 provide a technique recommendation as output 870, but output 870 is provided to a feedback recommendation training 880 process. In the feedback recommendation training 880 process, the output 870 is provided to a trained agent 882. The trained agent 882 produces an anonymized or pseudonymized dataset 884 from the new dataset 862 based on the technique recommendation. The anonymized or pseudonymized dataset 884 is subjected to objective checking 886, similar to that performed in FIG. 7. If the objective is not reached in the objective checking 886, the recommendation returns to the trained agent 882. If the objective checking 886 indicates that the objective is reached, the recommendation ends for the current dataset 888.

Thus, a retraining recommendation training 880 process block is added after the recommendation phase. It will generally be possible to retrain the agent. To do so, an embodiment simply has to take the first recommended technique as the initial state and repeat the training steps until the goals are reached. Furthermore, normally, the guidance process already knows in which direction to explore according to the information stored in the Q-table.

Once the machine learning model is trained and the recommendations generated, embodiments may proceed with providing output 870. Output 870 may include sharing results of the recommendation with a user. However, the system is not limited to sharing information, and may also include taking action to implement such a recommended strategy upon determining the recommended strategy. For example, the output 870 may include a recommended strategy, recommended explanations, and key data characteristics to have in mind when applying the strategy. Also, in addition to providing output 870, the method may include automatically implementing a preferred strategy in response to determining the preferred strategy. However, implementing the strategy may also include other factors in addition to being top-ranked, such as by considering aspects of the dataset.

In order to implement such a preferred strategy, each technique may have its own characteristics and may be adapted to the dataset accordingly. For example, a variety of techniques are presented in a ranked order in FIG. 12, below. By the time a technique has been selected, the dataset to de-identify has already been loaded. Thus, the given technique is applied to the dataset. Once the resultant de-identified data is produced, it may be shown to the user, such as by using a display. Alternatively, the de-identified data may be stored for future use. The user may also use the de-identified data in various ways, as desired. Since the data has been de-identified, may be safe to use without jeopardizing user privacy. For example, the data may be analyzed for various patterns for business applications, such as predicting user behavior in various business use cases, such as by developing marketing strategies.

Figure 9:
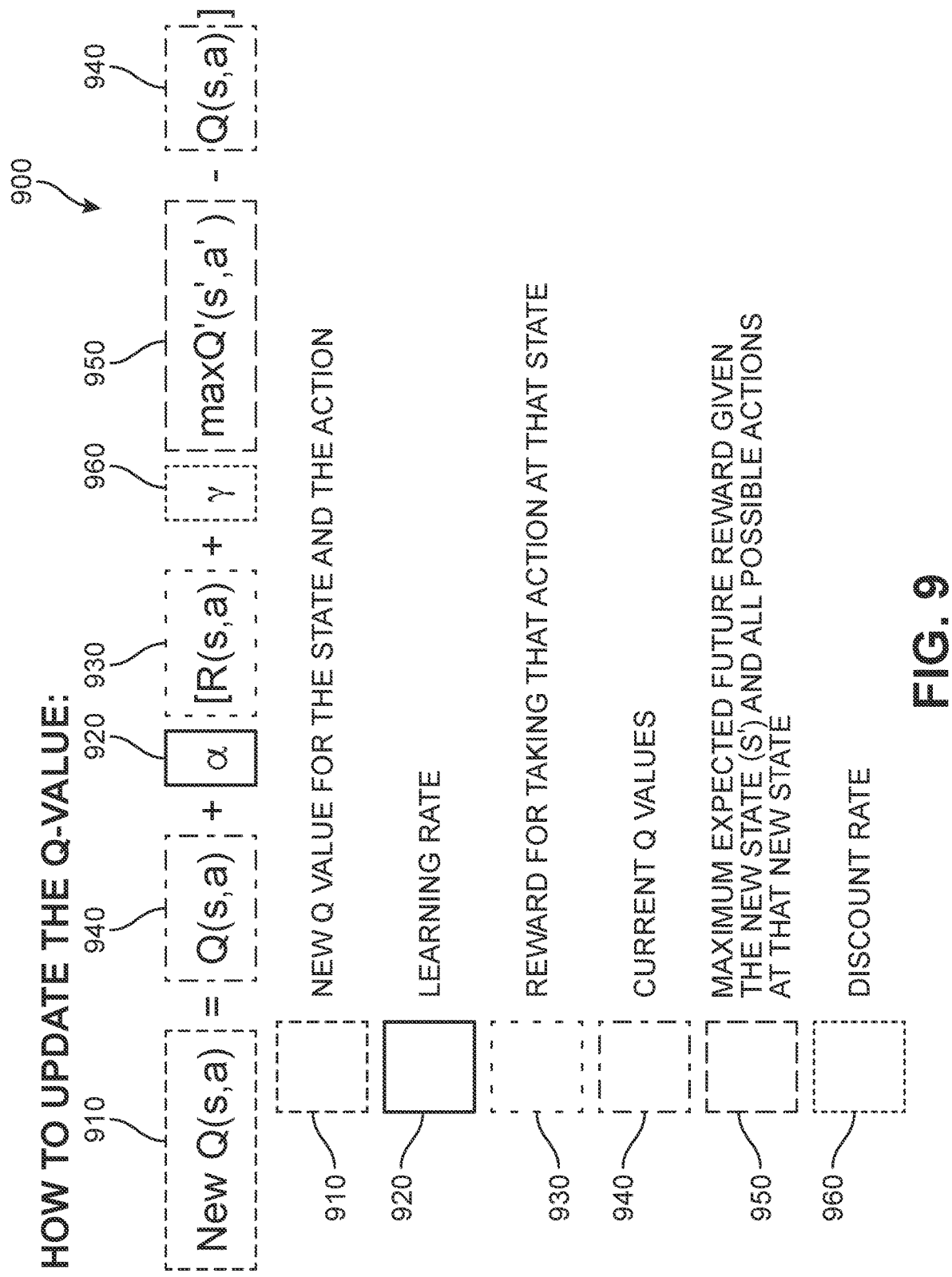
FIG. 9 is an example of a formula used to update the Q-value in machine learning according to an embodiment.

FIG. 9 is an example of a formula 900 used to update the Q-value in machine learning according to an embodiment. The formula is New $Q(s,a)=Q(s,a)+\alpha[R(s,a)+\gamma \max Q'(s', a')-Q(s,a)]$. New $Q(s,a)$ (element 910) is the new Q value for that state and the action. $\alpha$ (element 920) is the learning rate. $R(s,a)$ (element 930) is the reward for taking that action at that state. $Q(s,a)$ (element 940) is the current Q values. $\max Q'(s', a')$ (element 950) is the maximum expected future reward given the new state (s') and all possible actions at that new state. $\gamma$ (element 960) is the discount rate.

By using this equation, the Q-learning populates the Q-table with Q values, efficiently learning from the training data even though it is unlabeled. Adjusting parameters such as the learning rate $\alpha$ (element 920) and the discount result $\gamma$ (element 960) may further improve the Q-learning. Such adjustment may involve experimentation and other forms of adjustment in which a system observes which values of these parameters causes the Q-learning to explore most efficiently, both in terms of speed and resource utilization.

Figure 10:
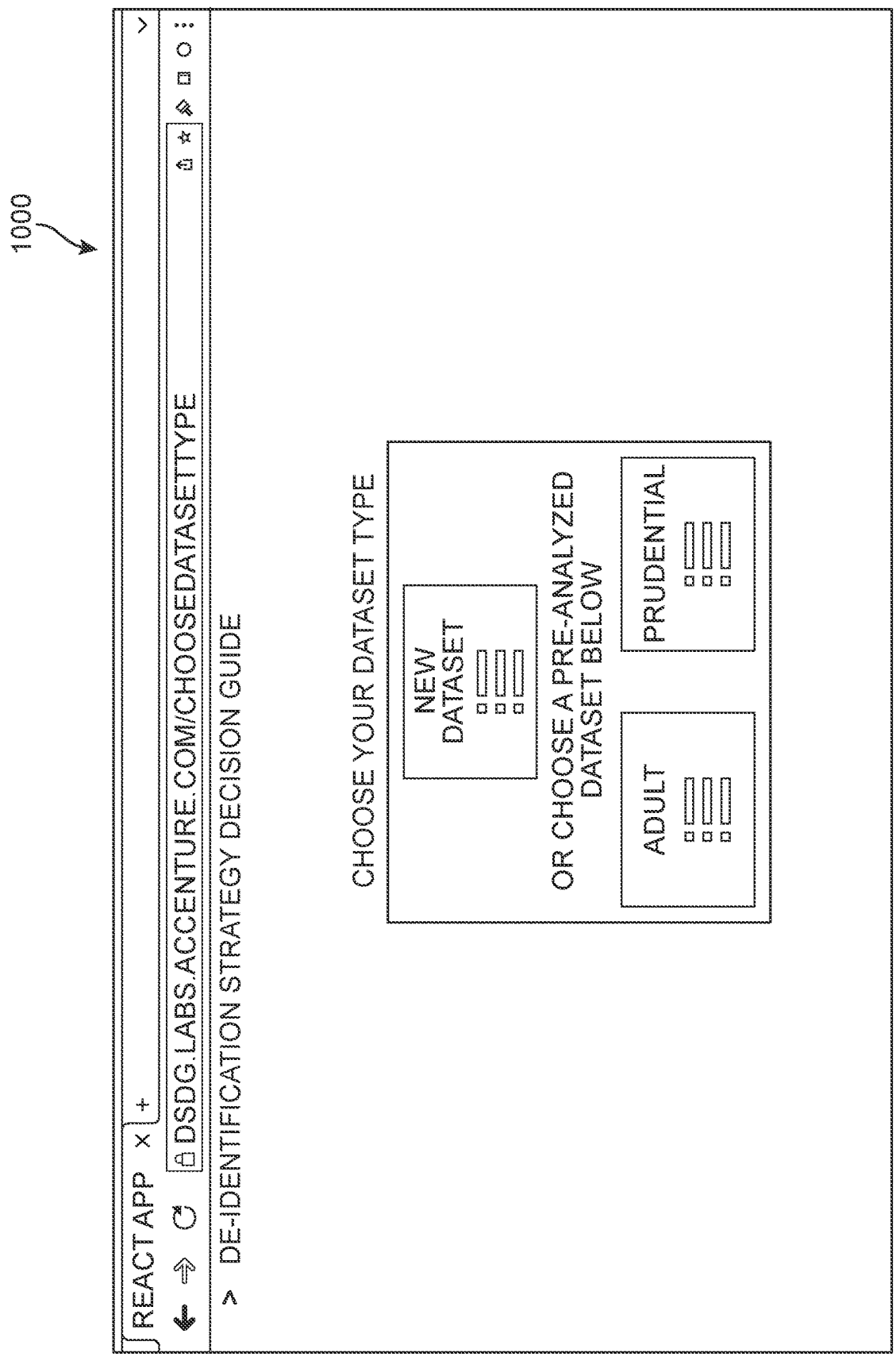
FIG. 10 is an example of a user interface used to load a dataset according to an embodiment.

FIG. 10 is an example of a user interface 1000 used to load a dataset according to an embodiment. Specifically, the user interface 1000 provides a user with the ability to provide a new dataset. Alternatively, the user interface 1000 allows the user to select a pre-analyzed dataset. For example, user interface 1000 presents the adult dataset and prudential dataset, as non-limiting examples. By selecting a dataset, the user interface 1000 identifies the dataset to be used as the dataset for the dataset and the data scope answers 142 in the process shown in FIG. 1.

Figure 11:
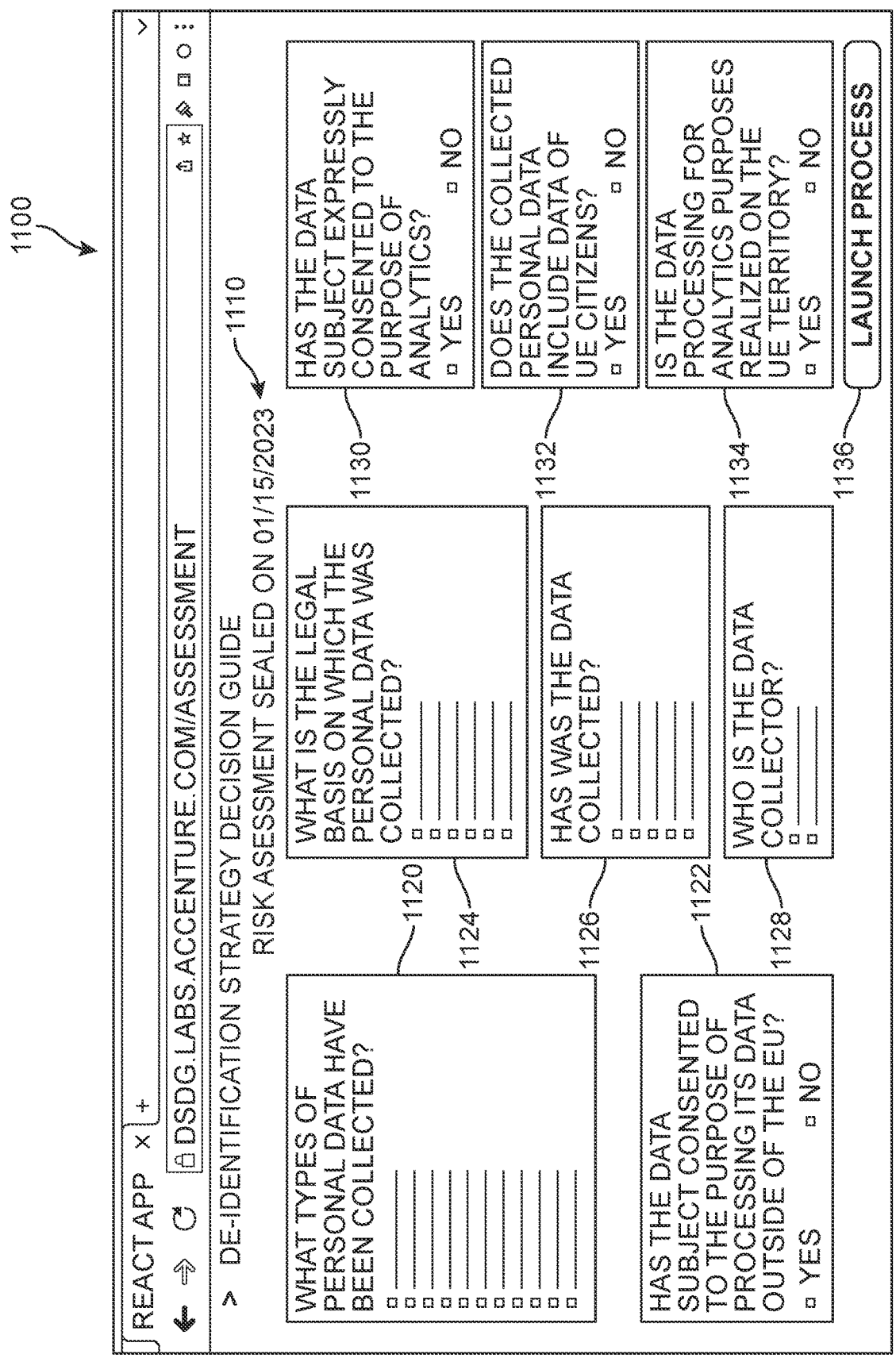
FIG. 11 is an example of a user interface used to perform a risk assessment according to an embodiment.

FIG. 11 is an example of a user interface used to perform a risk assessment 1100 according to an embodiment. The user interface may provide a series of multiple-choice questions. For example, the user interface may provide a web page or a dedicated application to administer the questions. FIG. 11 shows examples of various questions that are germane to performing a risk assessment 1110. For example, the questions may include questions related to which types of data were collected 1120, whether there was consent 1122, the legal basis on which the personal data were collected 1124 how the data was collected 1126, who was the data collector 1128, has the data subject provided express consent 1130, does the data include data of UE citizens 1132, is the data processing for analytics purposes realized on the UE territory 1134, and an option to launch the process. While not shown, there may also be questions related to express consent for processing of data outside of the EU, or at least being informed that such processing may occur.

Figure 12:
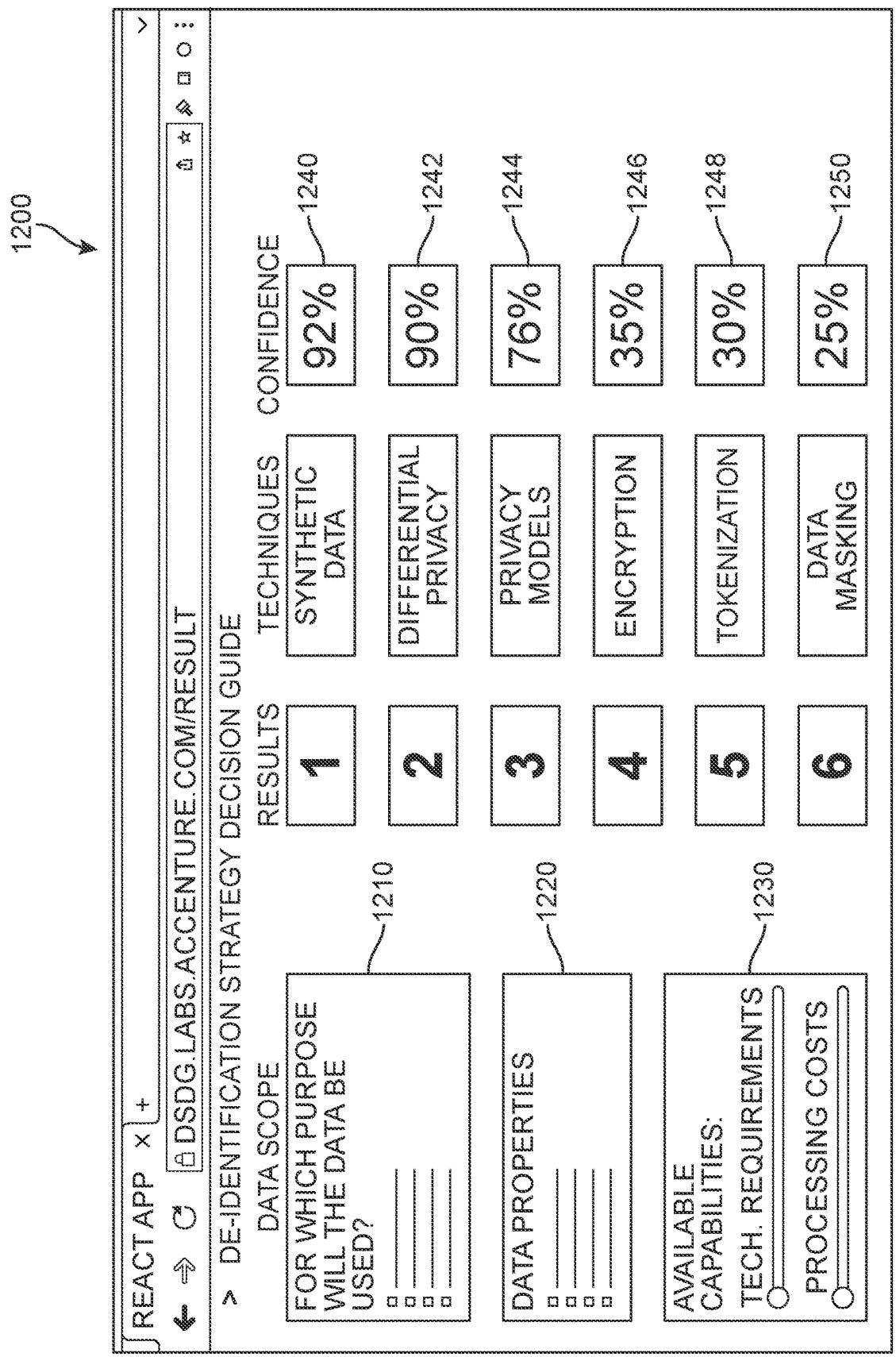
FIG. 12 is an example of a user interface used to present overall results for a data de-identification advisor according to an embodiment.

FIG. 12 is an example of a user interface used to present overall results for a data de-identification advisor 1200 according to an embodiment. For example, there may be a selectable value 1210 in which a user chooses for which purpose the data is to be used, and there may be choices such as for testing purposes, for machine learning, for data analytics, for data migration or transfer (e.g. cloud), or for data publishing. The user interface may also allow a user to specify certain data properties 1220, such as whether data reversibility is needed, whether it is a dynamic database, whether it is a relational database, and whether there is open audience exposure. The user interface may also allow the user to choose settings based on available capabilities 1230.

For example, the available capabilities 1230 may include settings for technical requirements and settings for processing costs.

FIG. 12 shows examples of six ranked results for de-identification strategies identified by embodiments. For example, there may be a result 1 of synthetic data 1240, a result 2 of differential privacy 1242, a result 3 of privacy models 1244, a result 4 of encryption 1246, a result 5 of tokenization 1248, and a result 6 of data masking 1250. Result 1 of synthetic data 1240 is an anonymization technique and is associated with a confidence value of 92%. Result 2 of differential privacy 1242 is an anonymization technique and is associated with a confidence value of 90%. Result 3 of privacy models 1244 is an anonymization technique and is associated with a confidence value of 76%. Result 4 of encryption 1246 is a pseudonymization technique and is associated with a confidence value of 35%. Result 5 of tokenization 1248 is a pseudonymization technique and is associated with a confidence value of 30%. Result 6 of data masking 1250 is a pseudonymization technique and is associated with a confidence value of 25%.

Figure 13:
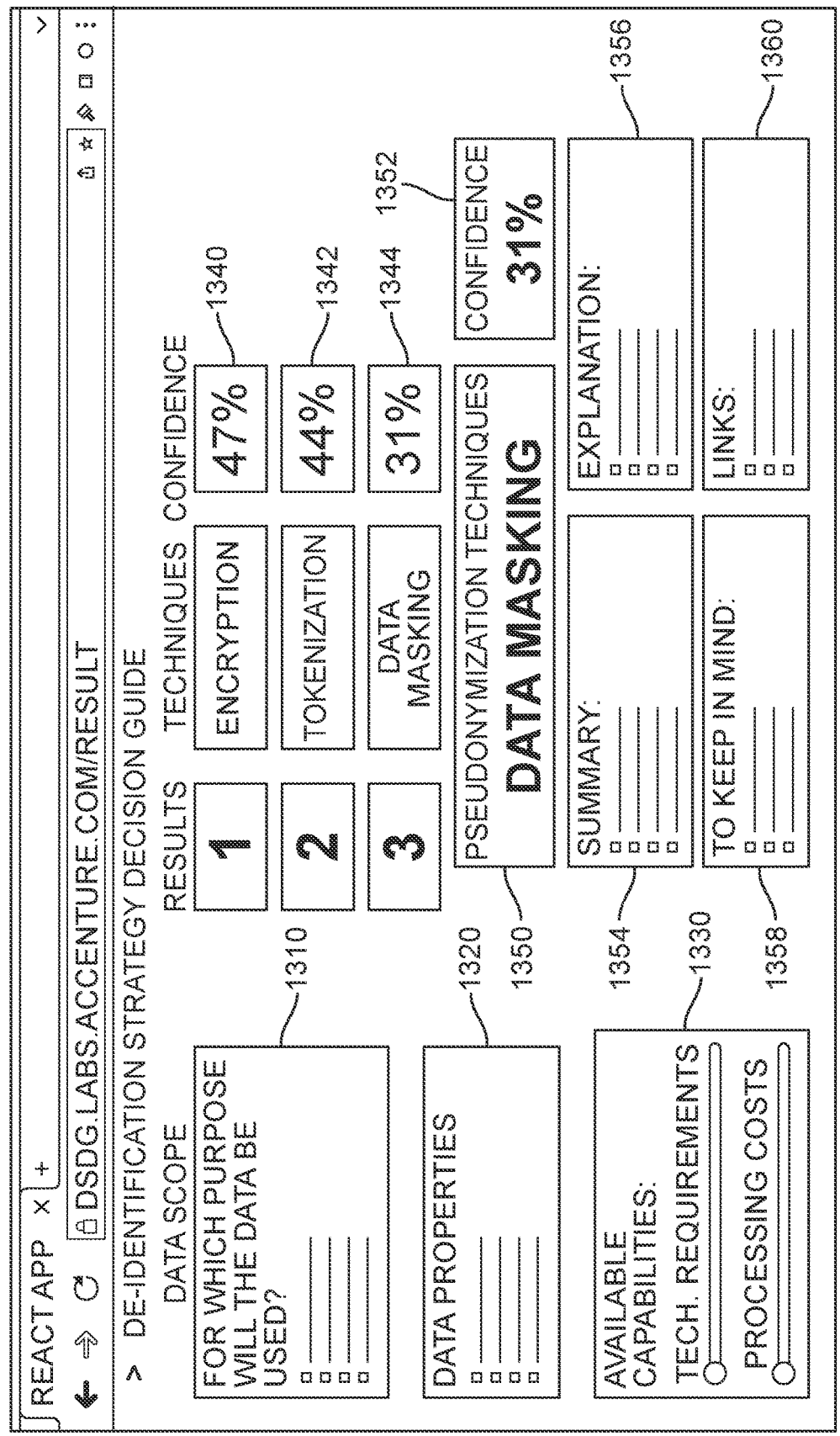
FIG. 13 is an example of a user interface used to present details of a particular technique for data de-identification according to an embodiment.

FIG. 13 is an example of a user interface 1300 used to present details of a particular technique for data de-identification according to an embodiment. FIG. 13 shows a user interface with a selectable value 1310 corresponding to that of selectable value 1210, a selectable value 1320 corresponding to data properties 1220, and a selectable value 1330 corresponding to available capabilities 1230. For example, selectable value 1310 may have a value of data publishing and selectable value 1320 may have a value of data reversibility being needed. Thus, fewer de-identification techniques remain viable. Accordingly, result 1 is encryption 1340 with a confidence value of 47%. Accordingly, result 2 is tokenization 1342 with a confidence value of 44%. Accordingly, result 1 is encryption 1344 with a confidence value of 31%.

FIG. 13 also shows details of one of the methods, in this case, pseudonymization technique 1350 data masking. FIG. 13 shows a confidence value 1352, 31%. FIG. 13 also shows summary data 1354, which may include information such as dataset size, de-identification purpose, reversibility needed, types of data contained, sensitivity, and data specificities. FIG. 13 also shows an explanation 1356 corresponding to the data masking. FIG. 13 also shows a set 1358 of reminders to keep in mind during the de-identification process and relevant links 1360.

Figure 14:
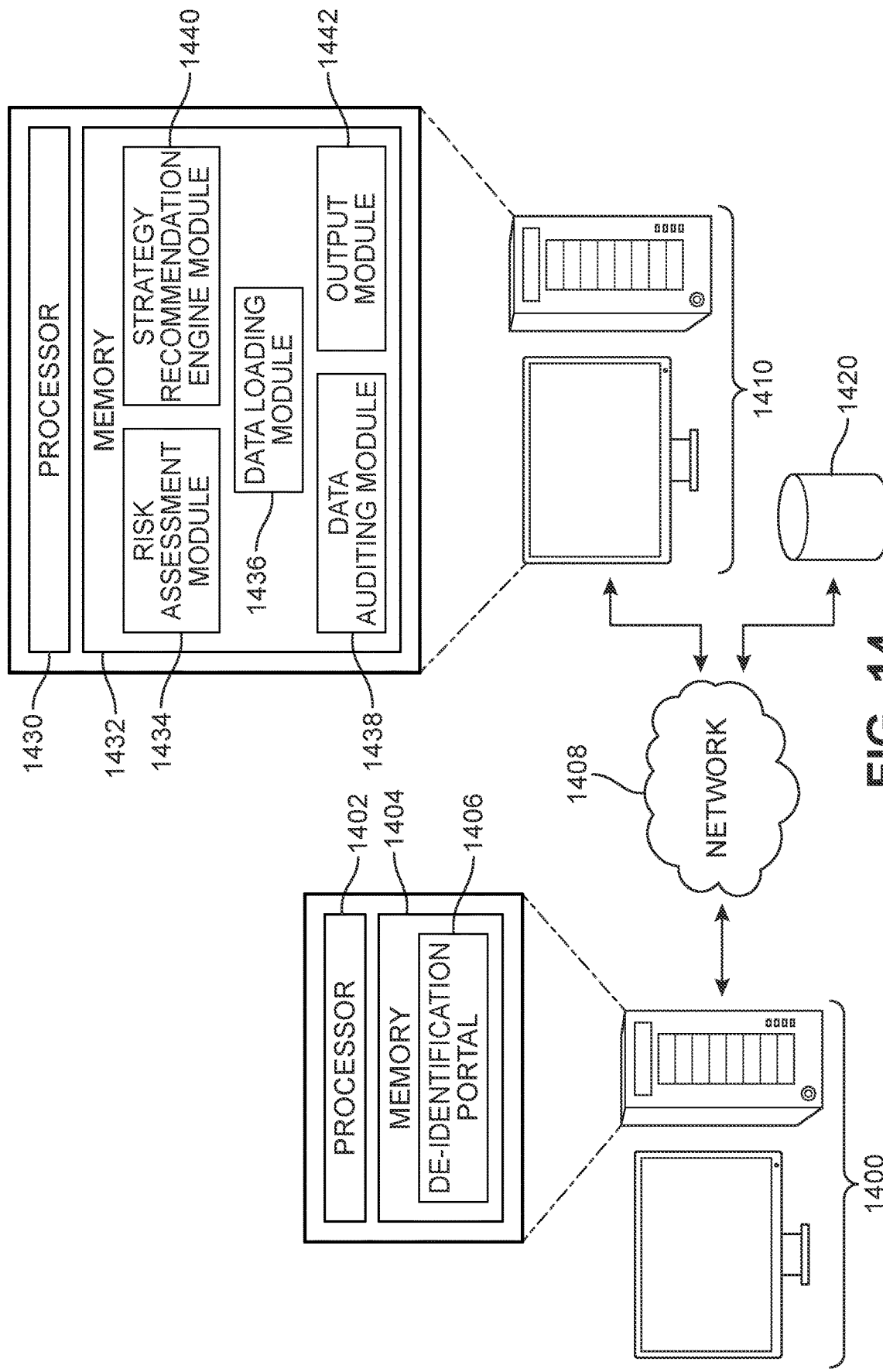
FIG. 14 shows a system for performing the disclosed method, according to an embodiment.

FIG. 14 shows a system for performing the disclosed method, according to an embodiment. As shown in the embodiment of FIG. 14, a system for performing some, or all, of the steps described in the embodiments can include a first computing system 1400, a second computing system 1410, databases 1420, and a network 1408. The computing systems could include a single computer, server and/or combination of multiple computers and/or servers.

First computing system 1400 and second computing system 1410 may communicate with each other and/or one or more databases 1420 over network 1408. In some embodiments, network 1408 may be a wide area network ("WAN"), e.g., the Internet. In other embodiments, network 1408 may be a local area network ("LAN"). For example, in a more remote location far from a metropolitan area, the Internet may not be available. In yet other embodiments, network 1408 may be a combination of a WAN and a LAN. Databases 1420 may comprise systems for storing submissions/documents. For example, databases 1420 may be relational databases, or other types of databases, as appropriate.

First computing system 1400 may include at least one processor 1402 and memory 1204 for storing information, including software information and/or data. The at least one processor 1402 may include a single device processor located on a single device, or it may include multiple device processors located on one or more physical devices. For example, in some embodiments, the system may include two or three user devices. The user device may be a computing device used by a user for communicating with the system. In some embodiments, one or more of the user devices may include a laptop computer, a smartphone, or a tablet computer. In other embodiments, one or more of the user devices may include a desktop computer and/or another type of computing device. The user devices may be used for inputting, processing, and displaying information. The user device may include a display that provides a user interface for the user to input and/or view information.

Memory 1404 may include any type of storage, which may be physically located on one physical device, or on multiple physical devices.

First computing system 1400 can include a de-identification portal 1406 stored within memory 1404. De-identification portal 1406 may include any software, processes or services used to interact with second computing system 1410 and databases 1420 to manage data de-identification. For example, de-identification portal 1406 may include a display of a user interface and may present to a user, via the display of the user interface, the ranked strategies.

The memory 1404 in the first computing system may include any type of storage, which may be physically located on one physical device, or on multiple physical devices.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

Embodiments may also include one or more computers (or processors or devices) and one or more storage devices storing instructions that are operable, when executed by the one or more computers, to cause the one or more computers to perform the disclosed methods.

Second computing system 1410 may include at least one processor 1430 and memory 1432 for storing information, including software information and/or data. The at least one processor 1430 may include a single device processor located on a single device, or it may include multiple device processors located on one or more physical devices. Memory 1432 may include any type of storage, which may be physically located on one physical device, or on multiple physical devices.

Second computing system 1410 can include a risk assessment module 1434, a data loading module 1436, a data auditing module 1438, a strategy recommendation engine module 1440, and an output module 1442, all stored within memory 1432. Risk assessment module 1434 may include any software, processes or services used to assess risk, for example, in the manner discussed with respect to FIG. 2. Data loading module 1436 may include any software, processes or services used to load the data, for example, in the manner discussed with respect to FIG. 1. Data auditing module 1438 may include any software, processes or services used to audit the data, for example, in the manner discussed with respect to FIG. 3. Strategy recommendation engine module 1440 may include any software, processes or services used to assess risk, for example, in the manner discussed with respect to FIG. 4. That is the strategy recommendation engine module 1440 may implement the strategy recommendation engine 160 discussed above. Output module 1442 may include any software, processes or services used to provide, for example, in the manner discussed with respect to FIG. 6 or by taking a preferred action.

Training, recommending, and implementing in this manner solves several problems that presently confront data de-identification. First, at present there is no real data de-identification history. Data clustering enables embodiments to train a recommendation engine without labelling. By clustering datasets with similar characteristics, the tool is able to identify potential similar scenarios with close outcomes and then facilitate the second part of the engine training where data de-identification is tested. The tool performs an iterative testing based on feedback from an evaluation phase to populate results and extract learnings about when a data de-identification works well or not and on which kind of data and its purposes. This step helps to build the training set for the recommendation engine and would have not been possible if made manually.

Second, each sensitive dataset has its own singular and distinguishing characteristics, so generalization is difficult. Data clustering helps to identify close datasets that can have similar outcomes when de-identified. This enables to generalize the learnings process without losing the perspective of each dataset's specific traits. A retraining loop is present at the end of the recommendation engine process in order to enables incremental learning and better consider rare or singular scenarios. The tool has been built with the ability to create new recommendation by combining different techniques to offer better recommendations and implement effective techniques.

Third, there are no legal or other guidelines that define when a data de-identification process is considered as successful. The present embodiments use an evaluation framework (e.g., a tool that assesses privacy and utility) to assess the success of a strategy based on its privacy-value guidelines. Note that this evaluation framework can be updated with an alternative one, if desired. The confidence score displayed at the end gives the likelihood of each strategy to satisfy the desired anonymity (or other data de-identification) needs and can be used to give indication to the user of the strategies of their relative merits. Alternately, the embodiments can take actions themselves to utilize a strategy that is likely to achieve good performance. Such a strategy may also be chosen to satisfy other criteria, such as use purposes, data properties, and available capabilities.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An artificial intelligence (AI)-based computer implemented method of data de-identification, the method comprising:

loading data in a dataset for de-identification;
loading data scope answers corresponding to the dataset;
performing a data audit on the data in the dataset;
providing the audited data and the data scope answers to a strategy recommendation engine trained to assess data de-identification strategies;
wherein the strategy recommendation engine is trained by clustering datasets in a datalake and performing reinforcement learning using the clustered datasets;
determining a cluster corresponding to the dataset for de-identification;
ranking strategies for data de-identification based on the determined cluster using the strategy recommendation engine; and
presenting to a user, via a display of a user interface, the ranked strategies.

2. The artificial intelligence (AI)-based computer implemented method of claim 1, further comprising performing a data risk assessment and confirming that results of the data risk assessment are acceptable.

3. The artificial intelligence (AI)-based computer implemented method of claim 1, further comprising determining a top-ranked data de-identification strategy satisfying criteria based on the data scope answers and automatically applying the top-ranked data de-identification strategy to de-identify the data in the dataset for de-identification.

4. The artificial intelligence (AI)-based computer implemented method of claim 1, further comprising retraining the strategy recommendation engine after ranking the strategies, wherein the retraining uses a successful data de-identification strategy as an initial state.

5. The artificial intelligence (AI)-based computer implemented method of claim 1, wherein the ranked strategies are further selected based on the data scope answers and the data scope answers comprise at least one of data use purpose, data properties, and available capabilities.

6. The artificial intelligence (AI)-based computer implemented method of claim 1, wherein the reinforcement learning includes applying random de-identification techniques to a sampled dataset in the datalake, checking with an assessment tool to determine if a desired de-identification criterion is satisfied, and labeling a technique as a successful technique for the sampled dataset when the desired de-identification criterion is satisfied.

7. The artificial intelligence (AI)-based computer implemented method of claim 1, wherein the reinforcement learning further includes using Q-learning and updating a Q-table with updated Q-values as reinforcement learning occurs to train the strategy recommendation engine.

8. A non-transitory computer-readable medium storing software comprising instructions executable by one or more computers which, upon such execution, cause the one or more computers to:

load data in a dataset for de-identification;
load data scope answers corresponding to the dataset;
perform a data audit on the data in the dataset;
provide the audited data and the data scope answers to a strategy recommendation engine trained to assess data de-identification strategies;
wherein the strategy recommendation engine is trained by clustering datasets in a datalake and performing reinforcement learning using the clustered datasets;
determine a cluster corresponding to the dataset for de-identification;
rank strategies for data de-identification based on the determined cluster using the strategy recommendation engine; and present to a user, via a display of a user interface, the ranked strategies.

9. The non-transitory computer-readable medium storing software of claim 8, wherein the instructions are further operable to cause the one or more computers to perform a data risk assessment and confirm that results of the data risk assessment are acceptable.

10. The non-transitory computer-readable medium storing software of claim 8, wherein the instructions are further operable to determine a top-ranked data de-identification strategy satisfying criteria based on the data scope answers and automatically apply the top-ranked data de-identification strategy to de-identify the data in the dataset for de-identification.

11. The non-transitory computer-readable medium storing software of claim 8, wherein the instructions are further operable to retrain the strategy recommendation engine after ranking the strategies, wherein the retraining uses a successful data de-identification strategy as an initial state.

12. The non-transitory computer-readable medium storing software of claim 8, wherein the ranked strategies are further selected based on the data scope answers and the data scope answers comprise at least one of data use purpose, data properties, and available capabilities.

13. The non-transitory computer-readable medium storing software of claim 8, wherein the reinforcement learning includes applying random de-identification techniques to a sampled dataset in the datalake, checking with an assessment tool to determine if a desired de-identification criterion is satisfied, and labeling a technique as a successful technique for the sampled dataset when the desired de-identification criterion is satisfied.

14. The non-transitory computer-readable medium storing software of claim 8, wherein the reinforcement learning further includes using Q-learning and updating a Q-table with updated Q-values as reinforcement learning occurs to train the strategy recommendation engine.

15. An artificial intelligence (AI)-based system for data de-identification, comprising:
   one or more computers and one or more storage devices storing instructions that are operable, when executed by the one or more computers, to cause the one or more computers to:
   load data in a dataset for de-identification;
   load data scope answers corresponding to the dataset;
   perform a data audit on the data in the dataset;
   provide the audited data and the data scope answers to a strategy recommendation engine trained to assess data de-identification strategies;
   wherein the strategy recommendation engine is trained by clustering datasets in a datalake and performing reinforcement learning using the clustered datasets;
   determine a cluster corresponding to the dataset for de-identification;
   rank strategies for data de-identification based on the determined cluster using the strategy recommendation engine; and
   present to a user, via a display of a user interface, the ranked strategies.

16. The system of claim 15, wherein the instructions are further operable to retrain the strategy recommendation engine after ranking the strategies, wherein the retraining uses a top-ranked data de-identification strategy as an initial state.

17. The system of claim 15, wherein the instructions are further operable to determine a top-ranked data de-identification strategy satisfying criteria based on the data scope answers and automatically apply the top-ranked data de-identification strategy to de-identify the data in the dataset for de-identification.

18. The system of claim 15, wherein the instructions are further operable to retrain the strategy recommendation engine after ranking the strategies, wherein the retraining uses a successful data de-identification strategy as an initial state.

19. The system of claim 15, wherein the ranked strategies are further selected based on the data scope answers and the data scope answers comprise at least one of data use purpose, data properties, and available capabilities.

20. The system of claim 15, wherein the reinforcement learning further includes using Q-learning and updating a Q-table with updated Q-values as reinforcement learning occurs to train the strategy recommendation engine.

* * * * *